(12) United States Patent
O'Krafka et al.

(10) Patent No.: US 8,385,740 B2
(45) Date of Patent: Feb. 26, 2013

(54) ARBITRATION SCHEME FOR AN OPTICAL BUS

(75) Inventors: Brian O'Krafka, Austin, TX (US); Pranay Koka, Austin, TX (US); John E. Cunningham, San Diego, CA (US); Ashok Krishnamoorthy, San Diego, CA (US); Xuezhe Zheng, San Diego, CA (US)

(73) Assignee: Oracle America, Inc., Redwood City, CA (US)

( * ) Notice: Subject to any disclaimer, the term of this patent is extended or adjusted under 35 U.S.C. 154(b) by 1214 days.

(21) Appl. No.: 12/176,294

(22) Filed: Jul. 18, 2008

(65) Prior Publication Data

US 2010/0014427 A1 Jan. 21, 2010

(51) Int. Cl.
*H04B 10/20* (2006.01)
*H04B 10/08* (2006.01)

(52) U.S. Cl. ............................. 398/60; 398/33; 398/36
(58) Field of Classification Search .................. 398/25, 398/30, 33, 36, 60, 73
See application file for complete search history.

(56) References Cited

U.S. PATENT DOCUMENTS

2005/0060459 A1* 3/2005 Chae .............................. 710/240
2005/0276604 A1* 12/2005 Morrow et al. ................. 398/73

OTHER PUBLICATIONS

Chae, C., Wong, E., and Tucker, R. S., Optical CSMA/CD Media Access Scheme for Ethernet Over Passive Optical Network, IEEE Photonic Technology Letters, May 2002, 3 pages.
Desai, B. N., An Optical Implementation of a Packet-Based (Ethernet) MAC in a WDM Passive Optical Nework Overlay, Mar. 2001, 3 pages.
Qin, X. and Yang, Y., Nonblocking WDM Switching Networks With Full and Limited Wavelength Conversion, IEEE Transactions on Communications, Dec. 2002, 10 pages.
Yang, Y. and Wang, J., Designing WDM Optical Interconnects with Full Connectivity by Using Limited Wavelength Conversion, IEEE Transactions on Computers, Dec. 2004, 10 pages.
Shacham, A., Bergman, K., and Carloni, L. P., On the Design of a Photonic Network-on-Chip, First International Symposium on Networks-on-Chip, May 2007, 12 pages.

* cited by examiner

*Primary Examiner* — Nathan Curs
(74) *Attorney, Agent, or Firm* — Osha Liang LLP (57) ABSTRACT

A method of arbitrating data transmissions to prevent data collisions in an optical data interconnect system including a transmitting node, a plurality of receiving nodes, and one or more remaining nodes connected through an optical data channel. The method involves transmitting a transmission request signal from the transmitting node over an arbitration channel corresponding to the transmitting node, monitoring, at the transmitting node, a plurality of arbitration channels corresponding to each of the plurality of receiving nodes and the one or more remaining nodes at the transmitting node for a predetermined period of time, determining a start time for a data transmission from the transmitting node based on the monitored signals to prevent a data collision, and initiating a data transmission of a data signal from the transmitting node over the optical data channel at the determined start time.

13 Claims, 6 Drawing Sheets

ARBITRATION SCHEME FOR AN OPTICAL BUS

CROSS REFERENCE TO RELATED APPLICATION

This application claims is related to U.S. patent application Ser. No. 12/176,293, entitled "COLLISION DETECTION SCHEME FOR OPTICAL INTERCONNECTS", with the same inventors and filed on the same day as this application.

BACKGROUND

As current designs close in on the physical limits of semiconductor based microprocessors, new problems, such as increased heat dissipation and power consumption, have prompted designers to consider alternatives to the traditional single die microprocessor. Accordingly, designers may employ parallel processing systems that include multiple microprocessors working in parallel in order to surpass the physical limits of a single processor system. However, such parallel systems with multiple processors place different sets of constraints on designers in comparison to single processor systems. For example, because each processor may be working on an independent task, many more requests to memory, or other processors, may be required. It may also be necessary to share information among the processors. Accordingly, the input/output ("I/O") bandwidth requirements for a system with multiple processors may be much higher than for a single processor system.

SUMMARY OF THE INVENTION

In general, in one or more aspects of the invention, the invention relates to a method of detecting transmission collisions in an optical data interconnect system. The method involves transmitting a transmission request signal from the transmitting node over an arbitration channel corresponding to the transmitting node, monitoring, at the transmitting node, a plurality of arbitration channels corresponding to each of the plurality of receiving nodes and the one or more remaining nodes at the transmitting node for a predetermined period of time, determining a start time for a data transmission from the transmitting node based on the monitored signals to prevent a data collision, and initiating a data transmission of a data signal from the transmitting node over the optical data channel at the determined start time.

In general, in one or more aspects of the invention, the invention relates to a system for transmitting a data signal within an optical data interconnect system. The system includes an optical data channel connecting a transmitting node, a receiving node, and one or more remaining nodes and configured to transmit the data signal from the transmitting node, and a plurality of arbitration channels, each with a channel width of at least one bit and configured to transmit a transmission request signal from the transmitting node, wherein each of the plurality of arbitration channels corresponds to each of the transmitting node, the plurality of receiving nodes, and the one or more remaining nodes, and an arbiter module configured to monitor, at the transmitting node of the optical data interconnect system, for a predetermined period of time, and determine a start time for a data transmission.

In general, in one or more aspects of the invention, the invention relates to a system for transmitting a data signal within an optical data interconnect system. The system includes a first optical data channel connecting a transmitting node and one or more remaining nodes and configured to transmit the data signal from the transmitting node, an optical splitter configured to split the first optical data channel, a second optical data channel connecting a plurality of receiving nodes to the first optical data channel through the optical splitter, a plurality of arbitration channels, each with a channel width of at least one bit, wherein each of the plurality of arbitration channels corresponds to each of the one or more remaining nodes and is configured to transmit a transmission request signal, and an arbiter module configured to monitor at the transmitting node of the optical data interconnect system for a predetermined period of time, and determine a start time for a data transmission.

Other aspects and advantages of the invention will be apparent from the following description and the appended claims.

BRIEF DESCRIPTION OF DRAWINGS

FIG. 2(*a*) shows a flow chart of a method of arbitrating data transmissions in accordance with one or more embodiments disclosed herein.

FIG. 2(*b*) shows a timing diagram in accordance with one or more embodiments disclosed herein.

DETAILED DESCRIPTION

Generally, embodiments of the disclosed invention relate to a system for and method of arbitrating data transmission to prevent data collisions in a system in which multiple processors, or nodes, may share information with each other over shared optical channels.

Specific details of the present disclosure will now be described in detail with reference to the accompanying figures.

Figure 1:
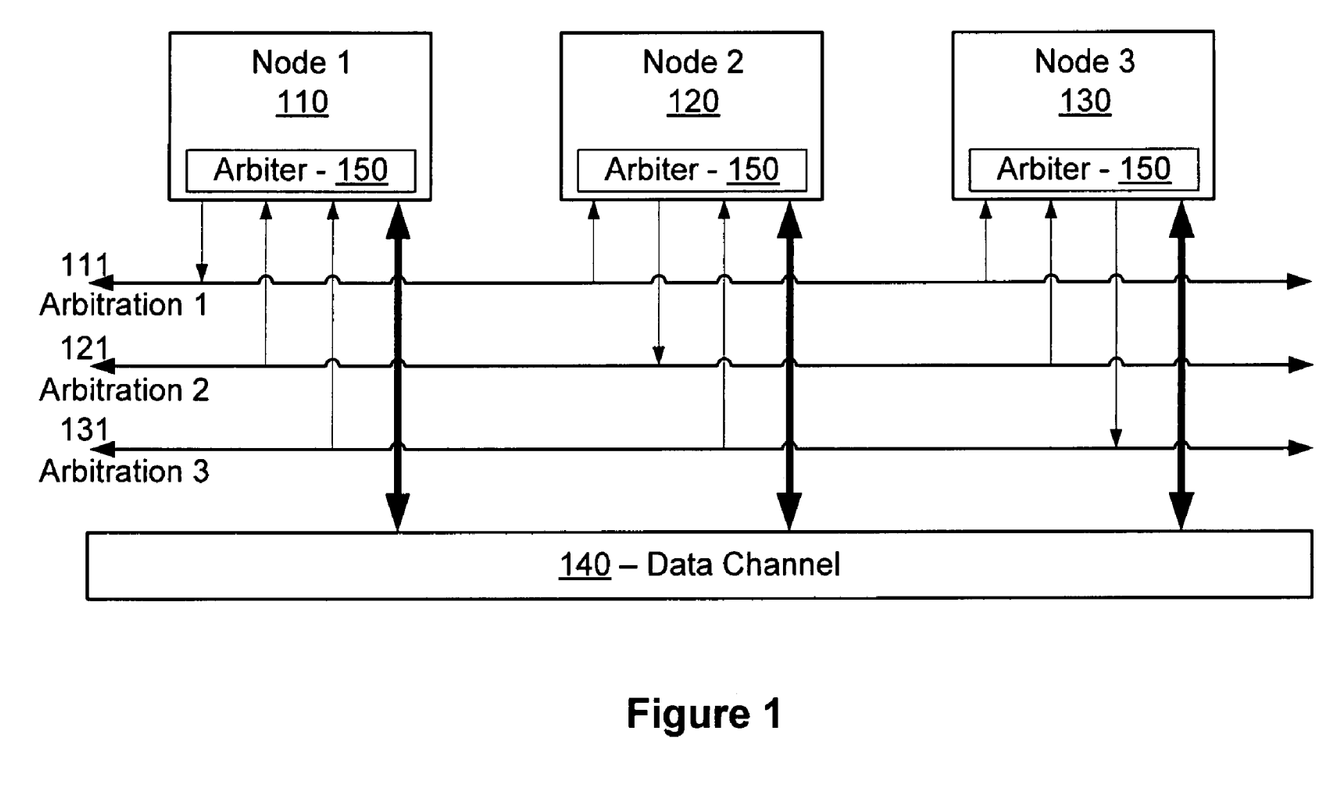
FIG. 1 shows an optical data interconnect system in accordance with one or more embodiments disclosed herein.

Referring now to FIG. 1, an optical data interconnect system 100 including three nodes (e.g., node 1 110, node 2 120, and node 3 130) and a data channel 140 is shown in accordance with one or more embodiments of the invention. In one or more embodiments of the invention, each of the nodes 110, 120, and 130 are able to transmit data signals to and receive data signals from each of the other nodes over the data channel 140. Because the data channel 140 is shared among each of the nodes 110, 120, and 130, data collisions, where two nodes wish to transmit data signals simultaneously, must be taken into account. Accordingly, in one or more embodiments of the invention, the optical data interconnect system 100 includes three arbitration channels (e.g., arbitration channel 1 111, arbitration channel 2 121, and arbitration channel 3 131), which correspond to the nodes 110, 120, and 130, respectively. Further, in one or more embodiments of the invention, each of the nodes 110, 120, and 130 in the optical data interconnect system 100 includes an arbiter module 150.

Each of the nodes 110, 120, and 130 may be a processor, or a group of processors, in a larger computing system. In order to maximize transmission bandwidth among the nodes 110, 120, and 130, data signals may be transmitted optically. Accordingly, the data channel 140 may be, for example, an optical waveguide capable of transmitting many optical wavelengths, and, therefore, many bits of information in a multiplexed scheme. The three arbitration channels 111, 121, and 131 may each also be an optical waveguide. Further, in order to minimize maximum travel time, each of the arbitration channels may form a ring, so that, for example, node 1 110 may transmit a signal directly to node 3 130 over arbitration channel 1 111. In one or more embodiments of the invention, the three arbitration channels 111, 121, and 131 are each single bit channels.

Figure 2A:
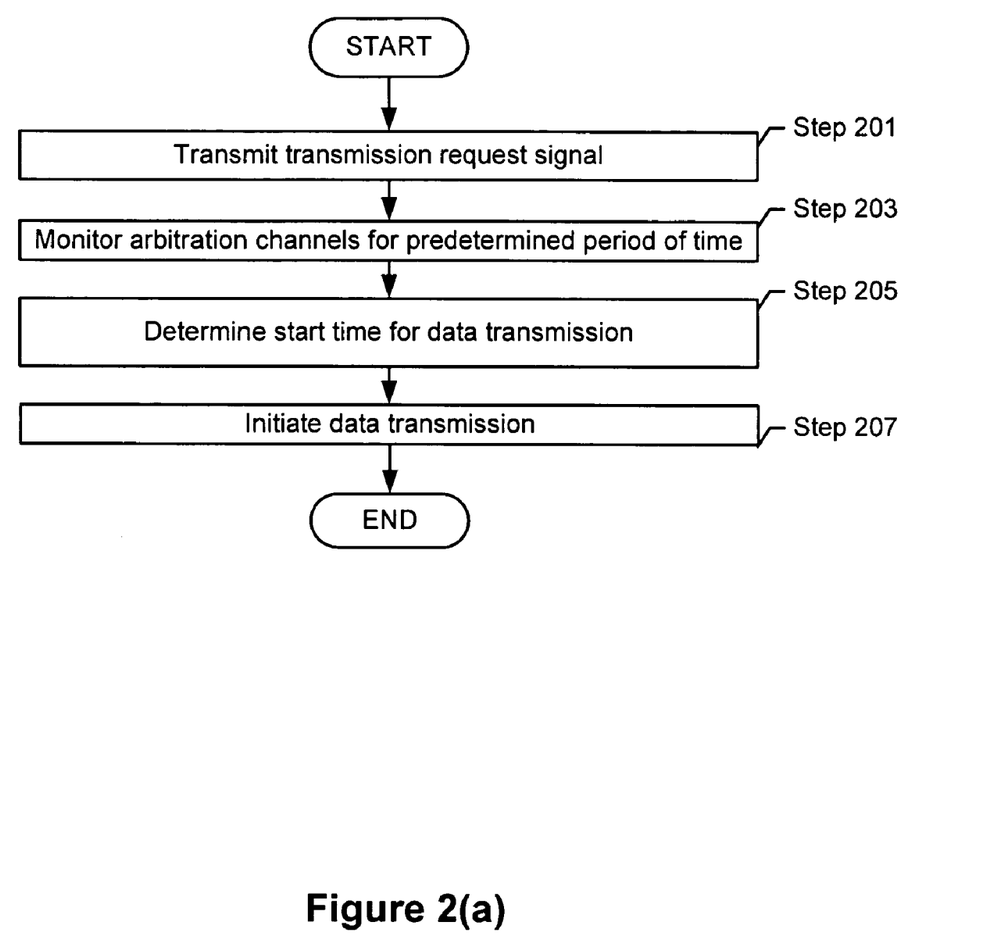

Referring now to FIG. 2(*a*), a method of transmitting a data signal within the optical data interconnect scheme is shown in accordance with one or more embodiments of the invention. First, in step 201, a node transmits a transmission request signal over the optical interconnect system 100 in accordance with one or more embodiments of the invention. For example, node 1 110 transmits a first transmission request signal over arbitration channel 1 111 that is received by node 2 120 and node 3 130. The first transmission request signal indicates to the remaining node 2 120 and node 3 130 that node 1 110 wishes to transmit a data signal over the optical data channel 140 at the next available opportunity.

In accordance with one or more embodiments, data signals transmitted within the optical interconnect system 100 may be of a fixed length, or period of time, in order to synchronize the three nodes 110, 120, and 130. Advantageously, fixed length data signals allow the three nodes 110, 120, and 130 to each independently determine the next available time slot for a data signal transmission. However, because the first transmission request signal takes some amount of time to reach the remaining node 2 120 and node 3 130, node 1 110 cannot be sure that the first transmission request signal alone will prevent a data collision. Accordingly, in step 203, an arbiter module 150 in node 1 110 monitors the arbitration channel 2 121 and arbitration channel 3 131 channels corresponding to node 2 120 and node 3 130, respectively, for a predetermined period of time in accordance with one or more embodiments of the invention. Then, in step 205, the arbiter module may determine a start time for the data transmission based on whether any further transmission request signals were received from node 2 120 or node 3 130. If, for example, node 1 110 and node 2 120 each send a transmission request signal indicating that they wish to transmit a data signal during the next available opportunity, the respective arbiters 150 in each of the node 1 110 and node 2 120 must determine start times for each of the data transmission.

Accordingly, the arbiters 150 may each further include a prioritized list of nodes including a pointer to the highest priority node in accordance with one or more embodiments. In the event that multiple nodes wish to transmit at the next available opportunity, the arbiters 150 determine the respective start times for the data transmission based on the prioritized list of nodes. Further, in accordance with one or more embodiments, the prioritized lists of nodes may be identical for each node, and the pointer may be incremented after each data transmission to indicate that a different node has highest priority.

Finally, in step 207, the node may initiate the data transmission at the start time determined by the arbiter in accordance with one or more embodiments of the invention.

Figure 2B:
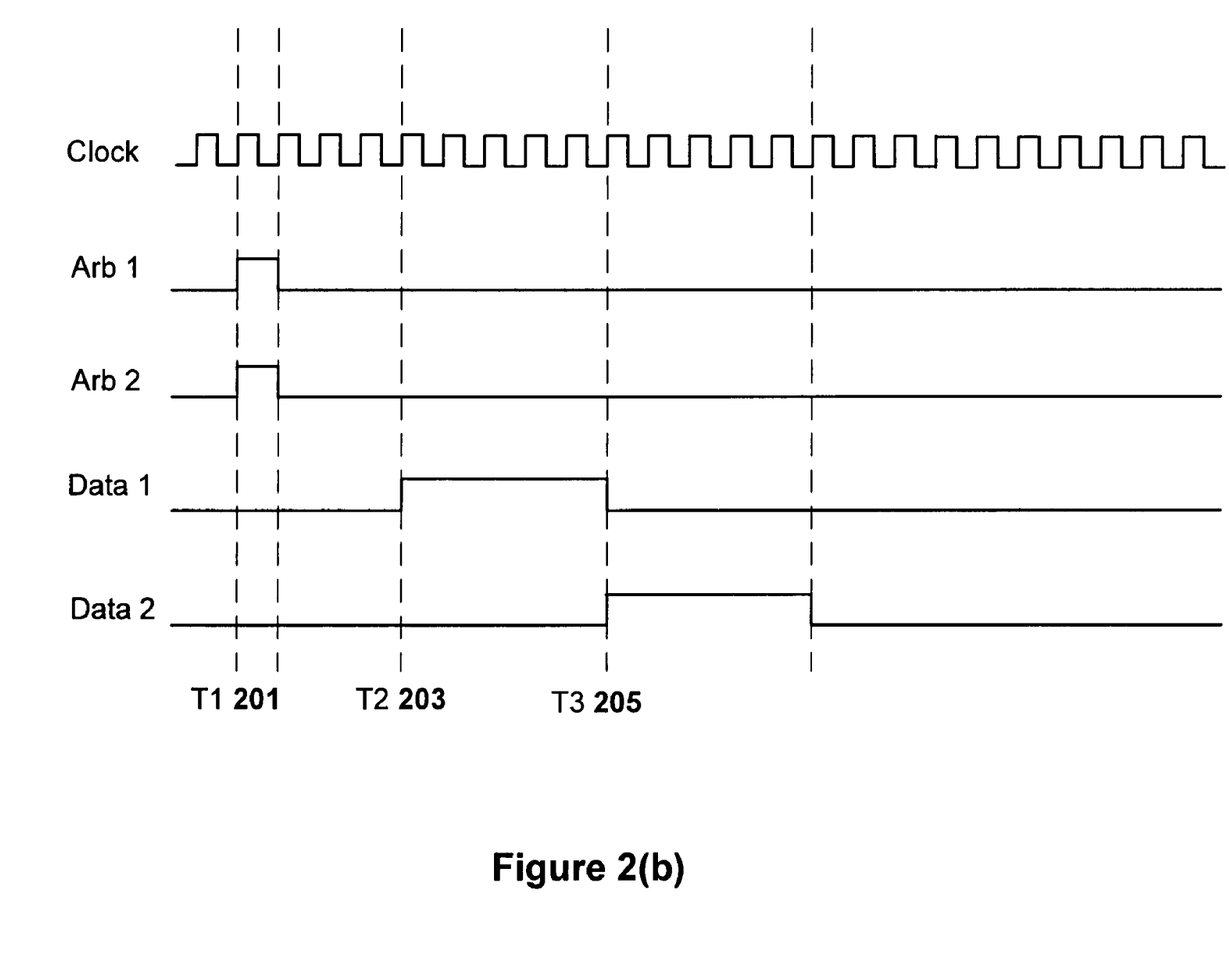

Referring now to FIG. 2(*b*), a timing diagram based on the example discussed above with respect to FIG. 2(*a*) is shown. At time T1 201, Node 1 transmits a first transmission request signal to Node 2 and Node 3 over arbitration channel 1 in accordance with one or more embodiments of the invention. Simultaneously, Node 2 transmits a second transmission request signal to Node 1 and Node 3 over arbitration channel 2 in accordance with one or more embodiments of the invention. Assuming the next available time slot is T2 203 and data signals are five clock periods in length, the arbiters in Nodes 1 and 2 may each independently determine which node will transmit at time T2 203 and which node will transmit immediately after at T3 205. In this example, each arbiter determines that Node 1 is higher priority than Node 2 for the next available time slot. Accordingly, Node 1 transmits a data signal Data 1 at T2 203 and Node 2 transmits a data signal Data 2 at T3 205.

Figure 3:
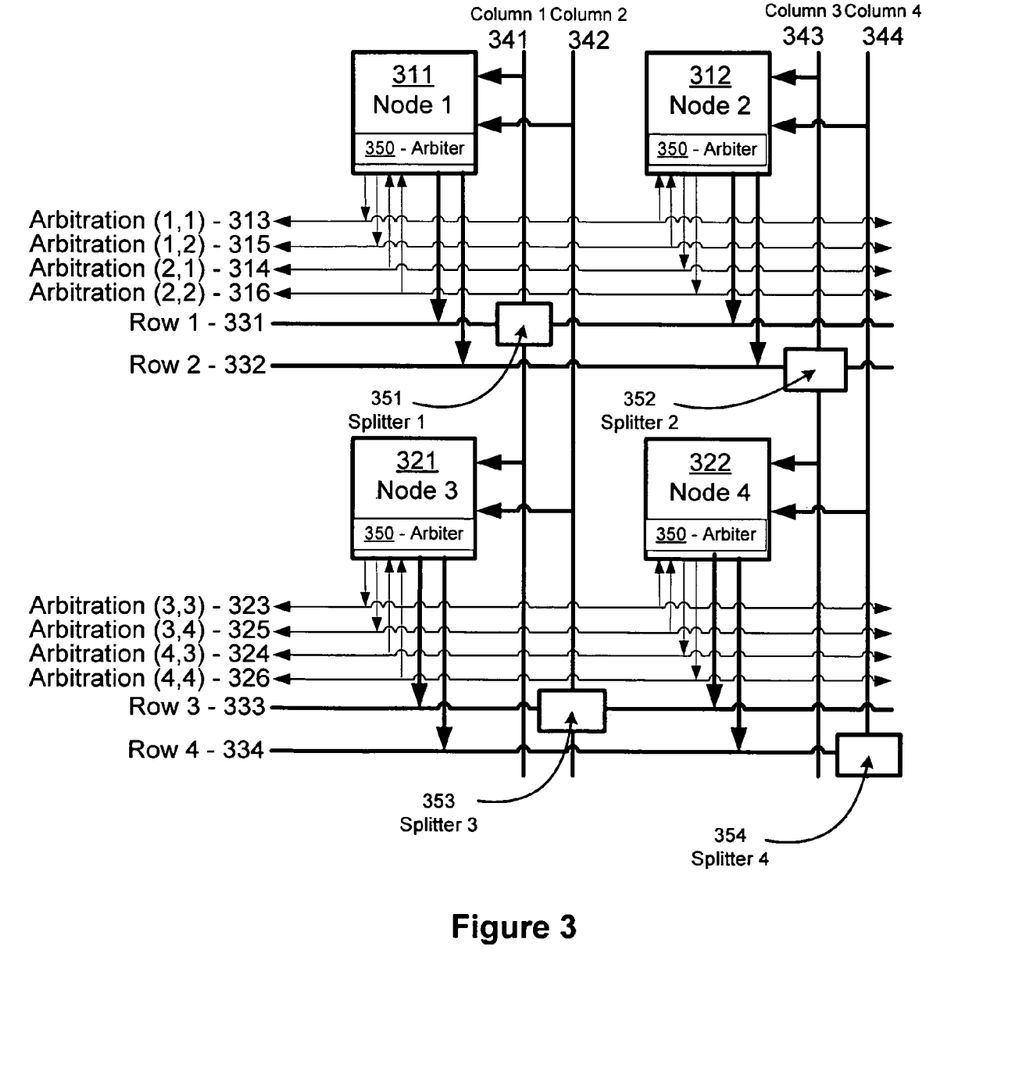
FIGS. 3 and 4 show an optical data interconnect system in accordance with embodiments disclosed herein.

Referring now to FIG. 3, an optical data interconnect system 300 including four nodes (e.g., node 1 311, node 2 312, node 3 321, and node 4 322) is shown in accordance with one or more embodiments of the invention. Each node 311, 312, 321, and 322 includes an arbiter module 350 in accordance with one or more embodiments of the invention. In one or more embodiments of the invention, the four nodes 311, 312, 321, and 322 are laid out in a grid formation, with nodes 311 and 312 forming a first row and nodes 321 and 322 forming a second row. Nodes 311 and 321 form a first column, and nodes 312 and 322 form a second column. Optical data channel rows 331, 332, 333, and 334 connect nodes that lie in the same rows, and optical data channel columns 341, 342, 343, and 344 connect nodes that lie in the same columns in accordance with one or more embodiments of the invention. As discussed above with respect to FIG. 1, data signals may be transmitted among the nodes over the optical data rows and columns.

Based on the configuration shown in FIG. 3, data is transmitted from a transmitting node over an optical data channel row, and received at a receiving node over an optical data channel column in accordance with one or more embodiments of the invention. Accordingly, in one or more embodiments of the invention, four optical splitters 351, 352, 353, and 354 join the four optical channel rows with the four optical data channel columns. In one or more embodiments of the invention, each of the optical splitters 351, 352, 353, and 354 splits an optical data signal transmitted from either direction on the corresponding row, and transmits the optical data signal in either direction on the corresponding column. The configuration shown in FIG. 3 allows each of the four nodes 311, 312, 321, and 322 to transmit data to each of the remaining nodes over shared data connections in accordance with one or more embodiments of the invention.

In order to transmit a signal to a receiving node, a transmitting node transmits a data signal on the row that is joined by a splitter to one of the columns that connects to the receiving node. Thus, each of the optical data channel rows 331, 332, 333, and 334, and the corresponding columns 341, 342, 343, and 344 are shared by two nodes in accordance with one or more embodiments of the invention. For example, in order for Node 2 312 to transmit a data signal to Node 3 321, Node 2 312 initiates a data transmission addressed to Node 3 321 on Row 1 331, which is split by splitter 351 to join Column 1 341. Node 3 321 receives signals directly from Column 1 341, so Node 1 and Node 3 are effectively connected. However, in order for Node 1 311 to transmit a data signal to Node 3 321, Node 1 311 would also initiate a data transmission addressed to Node 3 321 on Row 1 331. Thus, Row 1 331 and Column 1 341 are shared between Node 1 311 and Node 2 312, and collisions may occur if the two nodes attempt to transmit data to Node 3 321 simultaneously. Further, Row 2 332 and Column 3 343 are shared between Node 1 311 and Node 2 312, and collisions may occur if the two nodes attempt to transmit data to Node 4 322 simultaneously.

Accordingly, the configuration shown in FIG. 3 further includes arbitration channels 313-316 and 323-326, each of which corresponds to a specific node and a specific row in accordance with one or more embodiments of the invention. For example, Arbitration (1,1) 313 corresponds to Node 1 311 and Row 1 331, and if Arbitration (1,1) 313 is asserted high, Node 1 311 wishes to transmit over Row 1 331 at the next available opportunity. As discussed above with respect to FIG. 1, each of the nodes includes an arbiter module to monitor the remaining arbitrations channels in order to determine a start time for data transmissions in accordance with one or more embodiments of the invention. For example, if Node 3 321 wishes to transmit a data signal to Node 2 312 over Row 4 334, Node 3 321 asserts high on Arbitration (3,4) 325 before transmission, and monitors Arbitration (4,4) 326 for a predetermined period of time to determine whether Node 4 322 also wishes to transmit at the next available opportunity.

Figure 4:
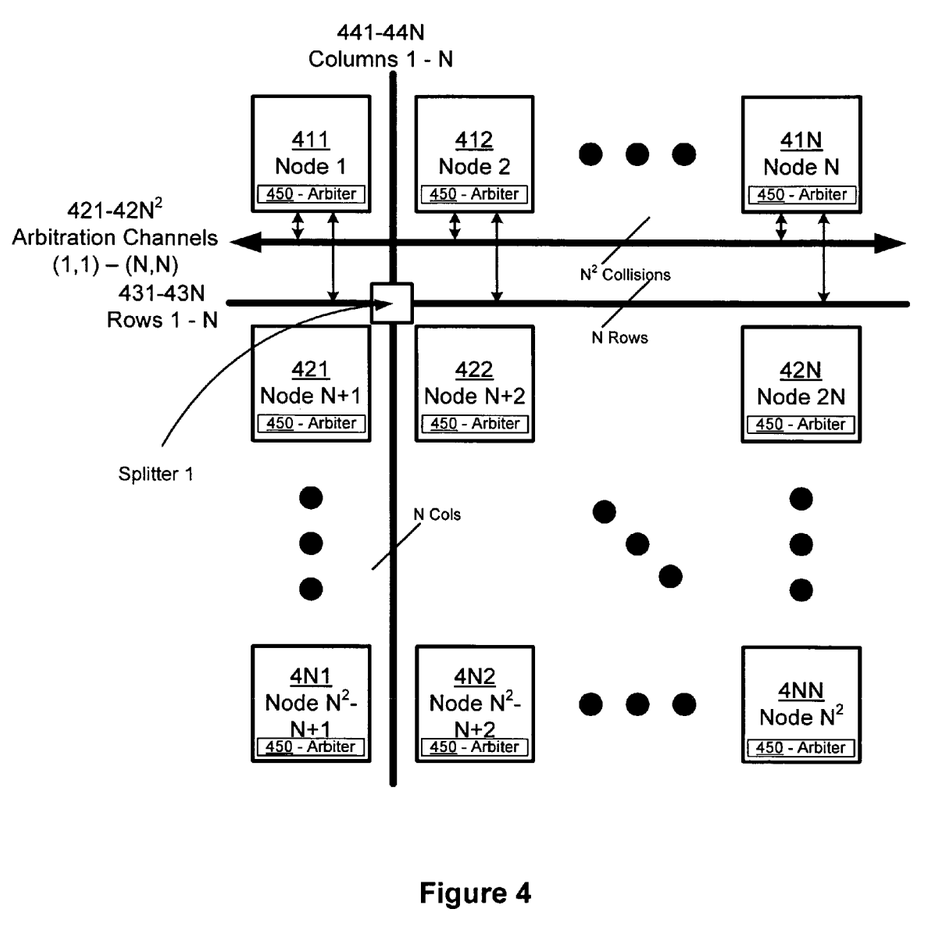

Referring now to FIG. 4, a generalized N×N grid analogous to the 2×2 grid shown in FIG. 3 is shown in accordance with one or more embodiments of the invention. The generalized N×N grid includes $N^2$ nodes arranged in N rows and N columns. Each of the N rows includes N optical data channel rows corresponding to each of the N columns. Each of the N optical data channel rows is connected to a corresponding optical data channel column through a splitter. Thus, there is one splitter at each of these junctions, and $N^2$ splitters total, though only one such junction is shown in FIG. 4. The generalized layout requires $N^2$ arbitration channels per row, and $N^2$ optical data channels in total. Note that individual nodes may be missing from the layout without affecting the overall optical data interconnect scheme. Though the generalized N×N grid may include many more nodes, the methods of transmitting data signals and detecting transmission collisions are analogous to the examples discussed above with respect to FIG. 3.

Figure 5:
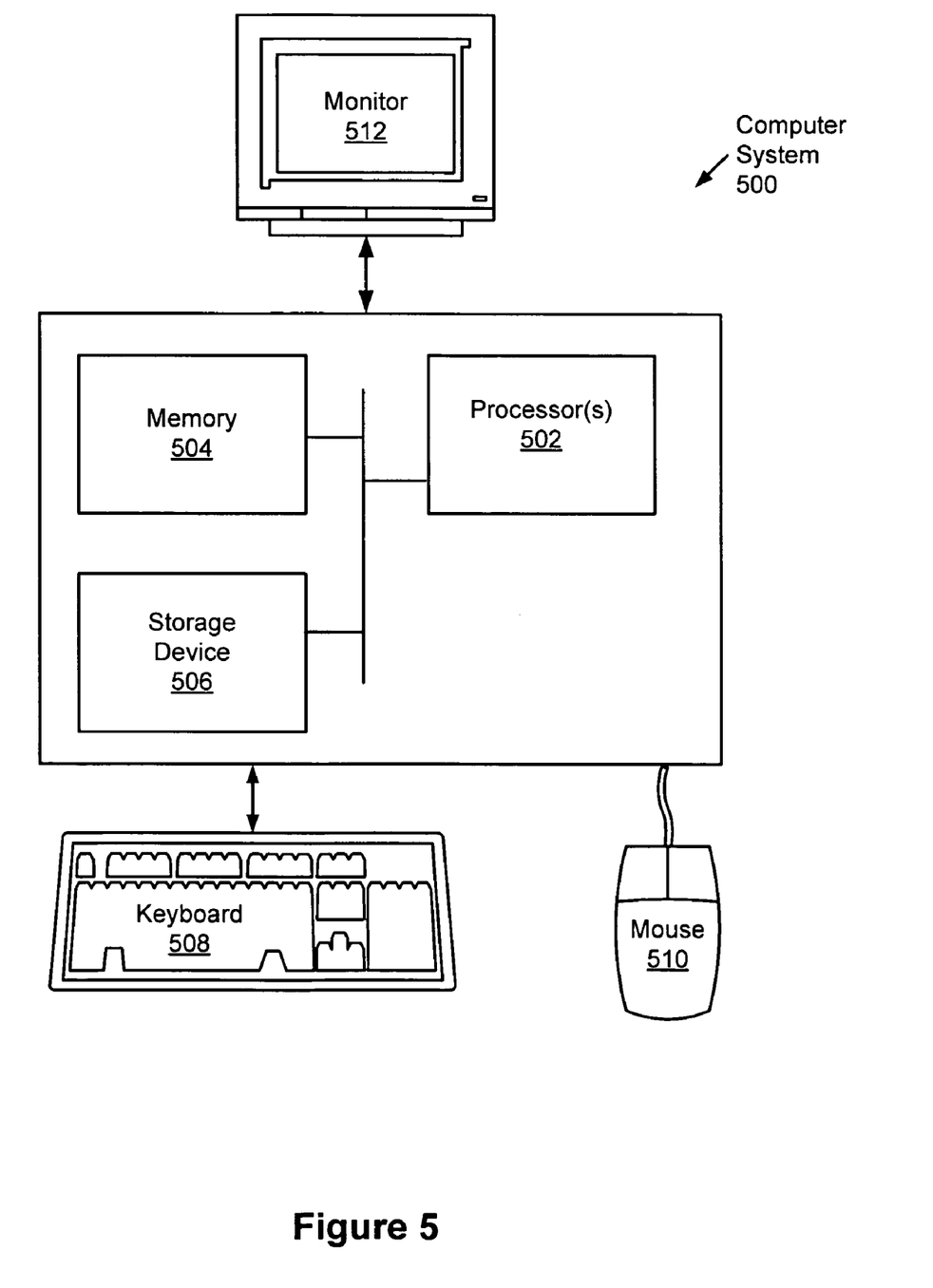
FIG. 5 shows a computer system in accordance with one or more embodiments disclosed herein.

Referring now to FIG. 5, portions of the invention may be implemented in software, such as, for example, the arbiter modules discussed above with respect to FIGS. 1 and 3. These portions of the invention may be implemented on virtually any type of computer regardless of the platform being used. For example, as shown in FIG. 5, a computer system 500 includes a processor 502, associated memory 504, a storage device 506, and numerous other elements and functionalities typical of today's computers (not shown). The computer system 500 may also include input means, such as a keyboard 508 and a mouse 510, and output means, such as a monitor 512. The computer system 500 is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer system 500 may be located at a remote location and connected to the other elements over a network.

Further, portions of the invention may be implemented on a distributed system having a plurality of nodes, where each portion of the invention may be located on a different node within the distributed system. In one or more embodiments of the invention, the node corresponds to a computer system. Alternatively, the node may correspond to a processor with associated physical memory.

In one or more embodiments of the invention, software instructions to perform embodiments of the invention, when executed by a processor, may be stored on a computer readable medium such as a compact disc (CD), a diskette, a tape, a file, or any other computer readable storage device. Further, one or more embodiments of the invention may be implemented as an Application Program Interface (API) executing on a computer system(s), where the API includes one or more software instructions.

Embodiments of the optical data interconnect arbitration scheme disclosed herein may exhibit one or more of the following advantages. The optical data interconnect system disclosed herein may arbitrate data transmissions, and thereby prevent optical data collisions, without requiring a centralized arbiter. Further, the optical data interconnect system disclosed herein may arbitrate optical data collisions while requiring a minimal amount of additional bandwidth. The optical data interconnect system disclosed herein has a symmetrical and uniform design, which may simplify the fabrication processes. The optical data interconnect system disclosed herein may also provide low serialization delays and low latency of transmission between nodes. Finally, the optical data interconnect system disclosed herein may also allow for minimal arbitration logic delay.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method of arbitrating data transmissions to prevent data collisions in an optical data interconnect system comprising a transmitting node, a plurality of receiving nodes, and a plurality of remaining nodes, comprising:
    transmitting a transmission request signal from the transmitting node over an arbitration channel corresponding to the transmitting node and operatively connected to the plurality of remaining nodes, wherein the transmitting node comprises an arbiter module;
    monitoring, at the arbiter module of the transmitting node, a plurality of arbitration channels each respectively corresponding to one of the plurality of remaining nodes for a predetermined period of time;
    determining, by the arbiter module of the transmitting node, a start time for a data transmission from the transmitting node based on the monitored signals to prevent a data collision;
    initiating, at the determined start time, a data transmission of a data signal from the transmitting node over a first optical data channel operatively connected to the plurality of remaining nodes and an optical splitter; and
    splitting, using the optical splitter, the data signal over a second optical channel operatively connected to the plurality of receiving nodes,
    wherein the optical splitter operatively connects the first optical data channel and the second optical data channel.

2. The method of claim 1, wherein transmitting the transmission request signal comprises transmitting one bit of information.

3. The method of claim 1, wherein the data transmission occurs for a predetermined length of time.

4. The method of claim 1, wherein the arbiter module comprises a prioritized list of nodes and the highest priority node in the list of nodes is designated with a pointer.

5. The method of claim 4, further comprising:
    incrementing the pointer after the data transmission.

6. A system for transmitting a data signal within an optical data interconnect system, comprising:
    a first optical data channel connecting a transmitting node and a plurality of remaining nodes and configured to transmit the data signal from the transmitting node;
    an optical splitter configured to split the first optical data channel;

a second optical data channel connecting a plurality of receiving nodes to the first optical data channel through the optical splitter;

a plurality of arbitration channels, each with a channel width of at least one bit, wherein each of the plurality of arbitration channels respectively corresponds to one of the plurality of remaining nodes and is configured to transmit a transmission request signal; and an arbiter module configured to:

monitor at the transmitting node of the optical data interconnect system for a predetermined period of time, and determine a start time for a data transmission.

7. The system according to claim 6, wherein the transmitting node, the receiving node, and the plurality of remaining nodes within the optical data interconnect system are arranged in a grid pattern comprising one or more rows of nodes and one or more columns of nodes.

8. The system according to claim 7, wherein the total number of arbitration channels depends on the total number of rows of nodes and the total number of columns of nodes in the grid pattern.

9. The system according to claim 7, wherein the plurality of receiving nodes comprise a column of nodes.

10. The system according to claim 7, wherein the transmitting node and the plurality of remaining nodes comprise a row of nodes.

11. The system according to claim 6, wherein each of the first and second optical data channels comprises an optical waveguide.

12. The system according to claim 6, wherein each of the plurality of arbitration channels comprises an optical waveguide.

13. The system according to claim 6, wherein the arbiter module is further configured to store a prioritized list of nodes, wherein the highest priority node in the list of nodes is designated with a pointer.

* * * * *